US012097639B2

(12) United States Patent
Salciccia

(10) Patent No.: US 12,097,639 B2
(45) Date of Patent: Sep. 24, 2024

(54) FORMWORK FOR THE CONSTRUCTION OF RAILWAY PLATFORMS

(71) Applicant: OVERAIL S.R.L., Rome (IT)

(72) Inventor: Gilberto Salciccia, Rome (IT)

(73) Assignee: OVERAIL S.R.L., Rome (IT)

(*) Notice: Subject to any disclaimer, the term of this patent is extended or adjusted under 35 U.S.C. 154(b) by 298 days.

(21) Appl. No.: 17/638,017

(22) PCT Filed: Sep. 7, 2020

(86) PCT No.: PCT/IB2020/058309
§ 371 (c)(1),
(2) Date: Feb. 24, 2022

(87) PCT Pub. No.: WO2021/044390
PCT Pub. Date: Mar. 11, 2021

(65) Prior Publication Data

US 2022/0274285 A1 Sep. 1, 2022

(30) Foreign Application Priority Data

Sep. 6, 2019 (IT) ........................ 102019000015743

(51) Int. Cl.
*B28B 7/34* (2006.01)
*B28B 7/04* (2006.01)
*E01B 3/40* (2006.01)

(52) U.S. Cl.
CPC ................ *B28B 7/04* (2013.01); *B28B 7/346* (2013.01); *E01B 3/40* (2013.01)

(58) Field of Classification Search
CPC .................................. B28B 7/346; E01B 3/40
See application file for complete search history.

(56) References Cited

FOREIGN PATENT DOCUMENTS

KR 20150005090 A * 1/2015 ............. B28B 7/306

* cited by examiner

*Primary Examiner* — James Sanders
(74) *Attorney, Agent, or Firm* — Jerold I. Schneider; Schneider IP Law

(57) ABSTRACT

Formwork (1) for the construction of railway platforms, comprising: a container (2) in which building material to be shaped and subjected to hardening for the construction of a railway platform can be compacted; at least one fixed crossbeam (3) located at the bottom of the container (2); at least one movable crossbeam (4) provided with at least one pair of fastening imprints (5) arranged symmetrically and configured to model the material to form a pair of fastening seats apt to position the rails on the railway platform; placed side by side with the fixed crossbeam (3) and defining therewith an impression surface on which said material can be molded for the construction of said railway platform; said movable crossbeam (4) being rotatable and/or translatable with respect to said fixed crossbeam (3), the configuration being such that different rotations and/or translations correspond to different positions in the container (2) of the fastening imprints (5) and different impression surfaces.

9 Claims, 3 Drawing Sheets

FORMWORK FOR THE CONSTRUCTION OF RAILWAY PLATFORMS

TECHNICAL FIELD OF THE INVENTION

The present invention relates to a formwork for the construction of railway platforms for armature system without ballast.

BACKGROUND

Railway infrastructures made with armature that do not involve the use of metaling or ballast are known. These infrastructures, rather than traditional metaling, provide the use of concrete or reinforced concrete platforms on which the tracks can be arranged and fixed.

The platforms are placed on the foundation plane, directly or by interposition of intermediate layers, along the development path of the infrastructure.

The prefabricated platforms are particularly important, since they allow a rapid construction of the infrastructure. This type of platform allows a modular construction of the infrastructure through the assembly of a moderate number of platforms along the path traced by the foundation plan.

Known prefabricated platforms have a base on whose surface suitable housing seats for the tracks are made.

A drawback of the use of prefabricated platforms is related to the fact that the paths can vary along their development, changing the angle of curvature according to the path to be followed and the prefabricated platforms are not adaptable to the peculiarities of each section of infrastructure. Prefabricated platforms, on the other hand, are produced with certain design parameters, length, width, orientation of the housing seats for the tracks, etc. For this reason, it is common that the platforms assembled in series do not perfectly follow the path to be followed.

This aspect has been only partially addressed in the applications developed to date. In several known solutions, the option for managing the position of the single platform as a function of the radius of the curve of the layout is not provided by any means. In other solutions, such an option is provided, although for step of variation of the curvature, not in a continuous manner. This approach implies that, since the rail can have a necessarily curved course as per design, what is not managed at the manufacturing level of the plate, is compensated for at the level of the engagement between the plates. The platforms are engaged by tilting one platform with respect to the other, using part of the positioning tolerances allowed by the engagement. However, these tolerances theoretically serve to restore geometric defects with respect to the theoretical position of the track, for this reason they must remain as an operating tolerance, therefore as residual at the end of the operations for defining the installation geometry of the track. The operating tolerances cannot be used, as is the case, during the construction step to bend the profile defined by several platforms assembled in series.

The aspect described resulted in significant critical issues in several applications. In several cases, the stresses generated between the rail which tends to assume a curved geometry of the project and the plate, through the engagement, involved breakages and damage, for example the breaking of the contrast shoulder for the engagement.

In light of this, the need to create prefabricated railway platforms capable of adapting to the trend of the infrastructure path's type is known.

It is further known the need to realize, as quickly as possible, platforms to be used for a given infrastructure, in order to shorten the execution times of the work.

SUMMARY OF THE INVENTION

The technical problem posed and solved by the present invention is therefore to provide a formwork for the construction of railway platforms which allows to overcome the drawbacks above mentioned with reference to the prior art.

This problem is solved by a formwork for the construction of railway platforms according to claim 1 and a process for the construction of a railway platform according to claim 11.

Preferred features of the present invention are the subject of the dependent claims.

The present invention provides several relevant advantages. The main advantage lies in that the devised formwork allows to create platforms with housing seats for tracks that can be rotated with respect to each other.

Due to its particular moving elements, the formwork is quick and easy to be adapted to obtain a platform with housing seats whose orientation can be adapted to the infrastructure path. In particular, it is quick and easy to obtain platforms whose housing sites can trace and follow the trend of the infrastructure path.

By appropriately orienting the moving elements on the basis of the design geometry of the path, platforms can be created such that, once assembled, do not use the operating tolerances, as the housing seats follow the geometric pattern required by the tracks.

Other advantages, features and methods of use of the present invention will become apparent from the following detailed description of several embodiments, presented by way of non-limiting example.

BRIEF DESCRIPTION OF THE DRAWINGS

Reference will be made to the figures of the engaged drawings, in which.

The thicknesses and curvatures shown within the figures above introduced are intended as purely illustrative, they are generally magnified and not necessarily shown in proportion.

DETAILED DESCRIPTION OF PREFERRED EMBODIMENTS

Various embodiments and variants of the invention will be described hereinafter, and with reference to the figures above introduced.

Similar components are denoted in the various figures by the same numerical reference.

In the following detailed description, further embodiments and variants with respect to embodiments and variants already treated in the same description will be illustrated limitedly referring to the differences with what has already been disclosed.

Furthermore, the different embodiments and variants described hereinafter can be used in combination, where compatible.

Figure 1:
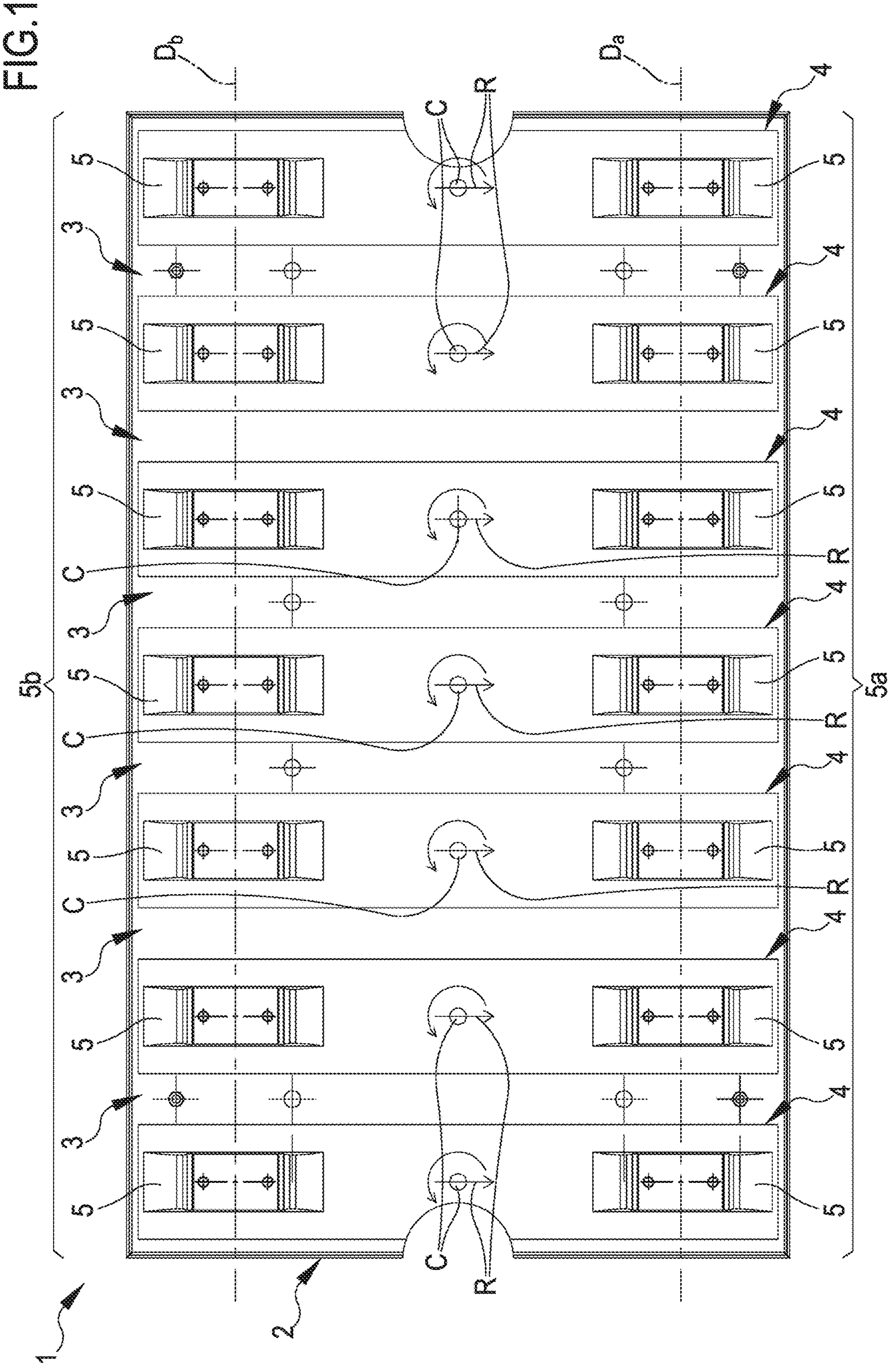
FIG. 1 shows a plan view of the formwork according to the invention.
Figure 2:
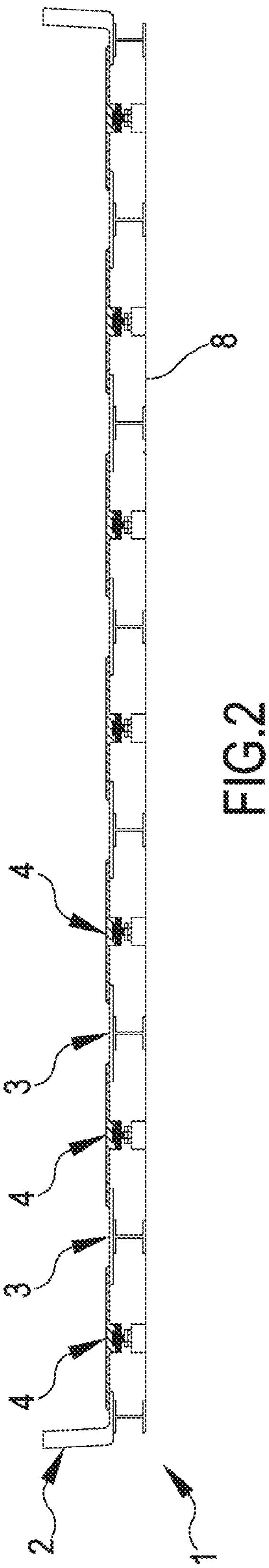
FIG. 2 shows a side sectional view of the formwork according to the invention.

With initial reference to FIG. 1, a formwork for the construction of railway platforms according to an embodiment of the invention is generally denoted by 1.

Formwork 1 comprises a container 2 in which building material to be shaped can be compacted and subjected to hardening for the construction of a railway platform.

The container 2 can be of the box-type having a bottom 8 and side walls surrounding the bottom defining a volume that can be filled with building material.

Building materials that can be used are typically cement conglomerates such as concrete, although alternative materials that can be used for the construction of building products, known in the state of the art, are not excluded.

The formwork 1 comprises at least one fixed crossbeam 3 placed at the bottom 8 of the container 2.

With particular reference to the figures, the fixed crossbeam 3 can comprise a surface portion 3*a* and a support portion 3*b*.

The surface portion 3*a* can be flat, although different conformations as a function of the final shape of the platform to be obtained are not excluded.

The supporting portion 3*b* is fixed to the bottom 8 and supports the surface portion 3*a*, maintaining the same raised from the bottom 8.

The portion 3*b* is usefully of the type of an "H" beam, although technically equivalent solutions are not excluded.

Different embodiments are not excluded in which the fixed crossbeam 3 has a different conformation from that illustrated.

Furthermore, formwork 1 comprise at least one movable crossbeam 4.

The movable crossbeam 4 is provided with at least one pair of fastening imprints 5 arranged symmetrically and configured to shape the material so as to form a pair of fastening seats apt to position the tracks on the railway platform.

When the building material is compacted in the formwork, it fills the available space, being molded accordingly. The material filling the space defined by the fastening imprints 5, once hardening is complete, will constitute the fastening seats of the railway platform on which the tracks will be positioned. The orientation of the starting footprints 5, therefore, defines the orientation of the fastening seats that must be compatible with the path following the tracks.

The movable crossbeam 4 is placed side by side with the fixed crossbeam 3 and defines therewith an impression surface on which the material for the realization of the railway platform can be molded.

The movable crossbeam 4 and the fixed crossbeam 3, therefore, define a surface, i.e. the impression surface, whose shape will be functional to model the building material within the formwork 1, thereby resulting in the final platform having a conformation that will trace the impression surface.

Advantageously, the movable crossbeam 4 is rotatable and/or translatable compared to the fixed crossbeam 3. The configuration is such that different rotations and/or translations correspond to different positioning of the fastening imprints 5 in container 2 and, therefore, different impression surfaces.

This feature allows to easily create platforms with fastening seats whose arrangement can be selected in advance by simply rotating/translating the fastening imprints 5. This technical effect is particularly advantageous in the context of the construction of railway infrastructures whose path has variable radii of curvature and whose tracks, therefore, must be placed along curved directions.

Usefully, the movable crossbeam 4 is approached to the surface portion 3*a* so as to realize a continuous surface, i.e. without holes or openings that may cause the building material to pour under the crosspieces 3, 4.

Preferably, the formwork 1 can comprise a plurality of fixed crossbeams 3 and a plurality of movable crossbeams 4.

The movable crossbeams 4 can be placed side by side with fixed crossbeams 3 in an alternating manner, i.e. defining fixed crossbeam 3—movable crossbeam 4 alternations.

This arrangement allows to define two parallel files of fastening imprints 5*a*, 5*b* arranged along respective development directions Da and Db.

Each movable crossbeam 4 can rotate/translate independently of each other, such that different impression surfaces, with different Da and Db directions, can be defined.

In particular, the movable crossbeams 4 can be oriented in such a way as to obtain Da and Db directions as compatible as possible with the path of the railway infrastructure. The railway platforms that will be obtained will have fastening seats suitable for the layout of the tracks, without running tolerances being consumed.

Referring to a single movable crossbeam 4, formwork 1 comprises moving means 6, 7 associated with movable crossbeam 4.

In particular, the moving means 6, 7 are configured to rotate the movable crossbeam 4 around a centre of rotation C.

Furthermore, the moving means 6, 7 is configured to translate the movable crossbeam 4 along a radial direction with respect to the centre of rotation C.

The moving means 6, 7 can translate and rotate the movable crossbeam, simultaneously or according to alternating sequences of rotations and translations.

Moving means 6, 7 may comprise at least one rotation shaft 6 connected to the movable crossbeam at the centre of rotation C.

The configuration is such that the rotation shaft 6 draws the movable crossbeam 4 in rotary motion around a substantially orthogonal axis A and passing through the centre of rotation C.

Preferably, the rotation of the movable crossbeam 4 takes place on a plane substantially parallel to the bottom 8 of the formwork 1, although rotations on different planes are not excluded, on condition that they are apt to properly position the fastening seats 5*a* and 5*b*.

Advantageously, the moving means 6, 7 comprises at least one guide element 7 which extends along a radial direction R and is associated with the movable crossbeam 4.

Usefully, the radial direction R can pass through the centre of rotation C.

The configuration is such that the movable crossbeam 4 can slide along the radial direction R.

Usefully, the guide element 7 can be connected to the rotation shaft 6, the configuration being such that the guide element 7 can rotate around the axis A.

Thereby, the rotation shaft 6 can draw the guide element 7 in rotary motion, by rotating the radial direction R with respect to axis A.

Advantageously, the guide element 7 can be interposed between the rotation shaft 6 and the movable crossbeam 4.

In particular, the guide element 7 can be drawn in rotary motion by shaft 6 and, in turn, draw the movable crossbeam 4 in rotary motion.

Usefully, at least one between the guide element 7 and the movable crossbeam 4 can comprise a prismatic portion 9, with the other between the guide element 7 and the movable crossbeam 4 that can comprise a prismatic seat 10 which can extend along the radial direction R.

The prismatic portion 9 and the prismatic seat 10 can be configured to form a prismatic coupling in which the portion 9 can slide into the seat 10.

Figure 3:
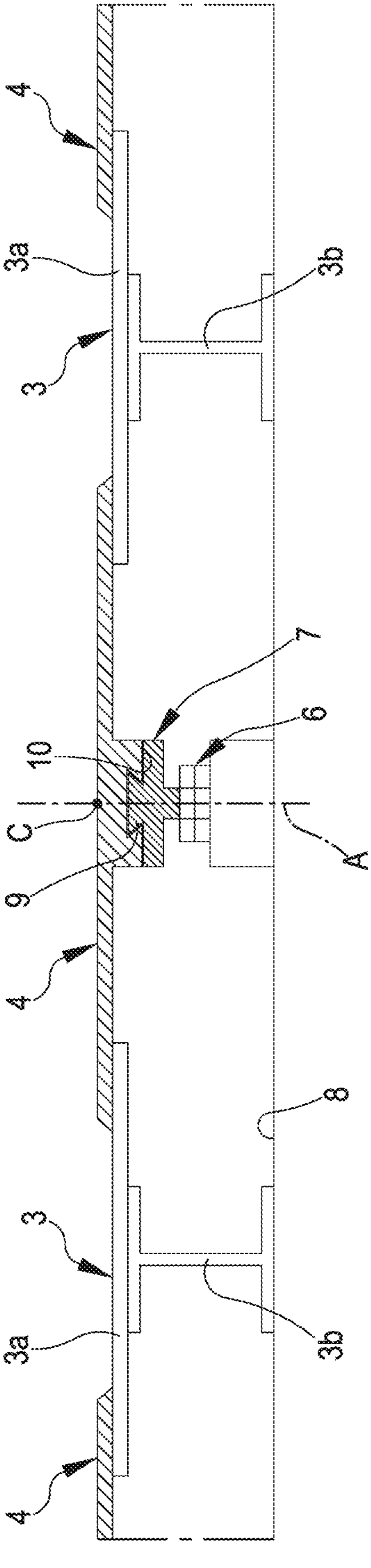
FIG. 3 shows a side sectional view of a detail of the formwork according to the invention.
Figure 4:
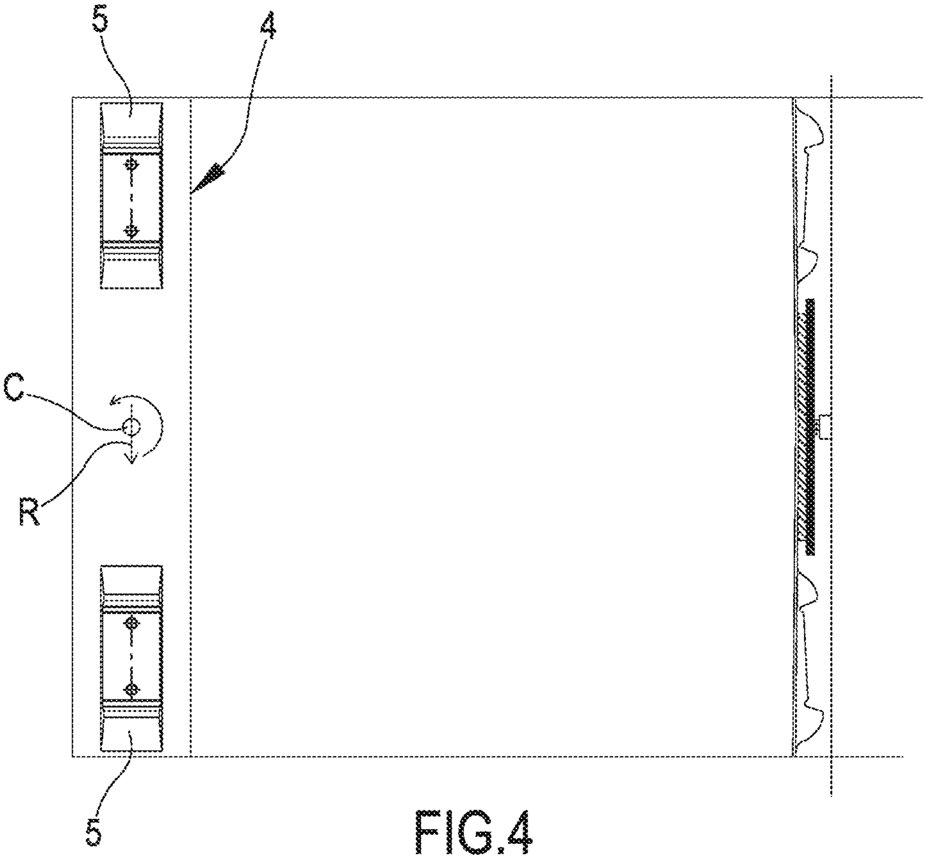
FIG. 4 shows a plan view of a detail of the formwork according to the invention.
Figure 5:
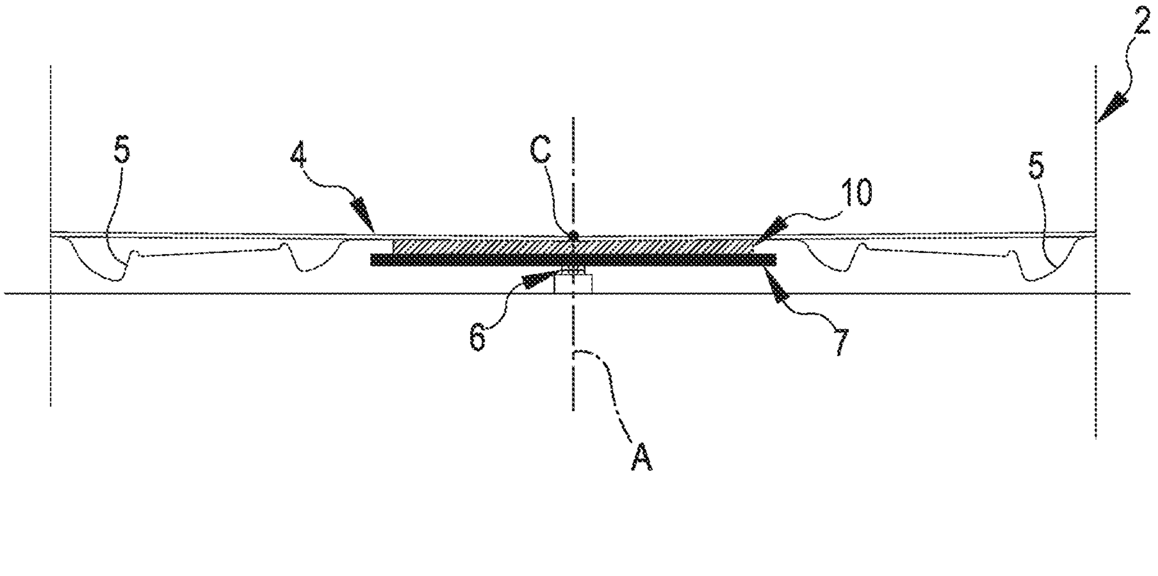
FIG. 5 shows a front sectional view of the formwork according to the invention.

With reference to FIG. 3, the prismatic portion 9 can have a trapezoid-shaped section whose oblique sides diverge in an upwards direction. On the other hand, the prismatic seat 10 can be of the type of a groove whose section is complementary to the prismatic portion 9.

Solutions providing different conformations are not excluded, on condition that they ensure a prismatic coupling in which the portion 9 can slide in the seat 10 along the longitudinal direction of the seat itself.

As previously described, formwork 1 comprises a plurality of movable crossbeams 4 that can be moved independently of each other.

In particular, each movable crossbeam 4 is rotatable around a centre of rotation C and/or translatable with respect to a respective radial direction R.

The configuration can be such that the development directions Da and Db can increase/decrease the radius of curvature as a function of the rotation/translation of each of the movable crossbeams 4 with respect to its centre of rotation C and/or to the respective radial direction R.

Thereby, on the basis of the project database comprising also the course of the infrastructure path, a user can rotate and/or translate the movable crossbeams 4 at will until the fastening imprints 5 are arranged along directions Da and Db compatible with the track itself.

Advantageously, the moving means 6, 7 comprise a control system, for the sake of simplicity not illustrated in the figures, configured for controlling the rotation and the translation of the movable crossbeam 4.

In particular, the control system can comprise at least one interface unit and one or more movement units operatively connected to the same interface unit.

The interface unit is configured to allow a user to control the rotation and translation of the mobile crossbeam(s) 4.

For example, by means of the interface unit the user can enter the design parameters relating to the curvature of the path followed by the tracks, thus setting the position that each movable crossbeam 4 is to assume.

The control system can be configured for both manual and power-assisted operation.

Usefully, the control system can comprise at least one electromechanical movement unit operatively connected to the movable crossbeam 4.

In particular, the electromechanical movement unit can be equipped with electromechanical motor means configured to move the movable crossbeam 4.

In particular, the electromechanical movement unit is configured to activate, control and deactivate the rotation of the shaft 6 and the translation of the element 7 guides in order to position the movable crossbeam 4 in a desired position.

Preferably, the control system can comprise at least one hydraulic movement unit operatively connected to the movable crossbeam 4 and configured to move the latter.

The hydraulic movement unit can be an alternative for the electromechanical movement unit or can operate in combination with the latter.

Advantageously, the control system comprises positioning means configured to detect the position of the movable crossbeam 4.

The positioning means can comprise various type of position encoders and/or detection sensors, or precision topographical instrumentation.

A process for the construction of a railway platform can comprise the following steps.

In a first step, a formwork 1 similar to that previously described is provided.

Subsequently the formwork is configured through rotations and/or translations apt to define an impression surface compatible with a railway track.

In particular, the translations and rotations relate to the movable crossbeams 4.

The movable crossbeams 4 are rotated and translated until the same are drawn to a desired position, based on design conditions.

More specifically, a user can enter design data relating to the railway track and, therefore, set the Da and Db directions compatible with the path.

The control system implements the above rotations and translations until the movable crossbeams 4 are positioned in such a way that the directions Da and Db are traced by the fastening imprints 5.

Subsequently, the process provides to pour building material in the liquid phase into the configured formwork.

The building material can be concrete, although other materials suitable for the purpose and having hardening properties are not excluded.

The building material in the liquid phase fills the volume defined by formwork 1 and adapts to the impression surface defined in the previous step, assuming the shape thereof.

Subsequently, the poured building material is allowed to harden until a railway platform is obtained, whose surface follows the impression surface of the formwork 1.

The present invention has been hitherto described with reference to preferred embodiments. It should be understood that other embodiments may exist that pertain to the same inventive core, as defined by the scope of the claims set forth below.

The invention claimed is:

1. Formwork for the construction of railway platforms, comprising a container in which building material to be shaped and subjected to hardening for the construction of a railway platform can be compacted;

at least one fixed crossbeam located at the bottom of said container;

at least one movable crossbeam provided with at least one pair of fastening imprints arranged symmetrically and configured to model said material to form a pair of fastening seats apt to position the rails on said railway platform;

placed side by side with said fixed crossbeam and defining therewith an impression surface on which said material can be molded for the construction of said railway platform; said movable crossbeam being rotatable and/or translatable with respect to said fixed crossbeam, the configuration being such that different rotation and/or translations correspond to different positions in the container of the fastening imprints and different impression surfaces;

and the formwork characterized in that it comprises moving means associated with said movable crossbeam configured to rotate said movable crossbeam around a center of rotation and/or to translate said movable crossbeam along a radial direction with respect to the center of rotation.

2. Formwork according to claim 1, characterized in that said moving means comprises at least one rotation shaft connected to said movable crossbeam at said center of rotation, the configuration being such that said rotation shaft draws said movable crossbeam in rotary motion around an axis that is substantially orthogonal and passing through said center of rotation.

3. Formwork according to claim 1, characterized in that said moving means comprises at least one guide element which extends along a radial direction passing through said center of rotation, associated with said movable crossbeam, the configuration being such that said movable crossbeam can slide along said radial direction.

4. Formwork according to claim 3, characterized in that said guide element is connected to said rotation shaft, the configuration being such that said guide element can rotate around said axis.

5. Formwork according to claim 1, characterized in that said guide element is interposed between said rotation shaft and said movable crossbeam.

6. Formwork according to claim 5, characterized in that at least one of said guide element and said movable crossbeam comprises a prismatic portion, with the other of said guide element and said movable crossbeam which comprises a prismatic seat which extends along said radial direction, said prismatic portion and said prismatic seat being configured to form a prismatic coupling in which said prismatic portion can slide in said prismatic seat.

7. Formwork according to claim 1, characterized in that said moving means comprises a control system operatively connected to said movable crossbeam and configured for controlling the rotation and translation of said movable crossbeam.

8. Formwork according to claim 1, characterized in that it comprises a plurality of fixed crossbeams and a plurality of movable crossbeams arranged side by side with said fixed crossbeams and in an alternating manner, defining two parallel rows of fastening imprints arranged along respective development directions.

9. Formwork according to claim 8, characterized in that said movable crossbeams can be moved independently of each other, the configuration being such that said development directions can increase/decrease a radius of curvature as a function of the rotation/translation of each of said movable crossbeams with respect to a respective center of rotation and to a respective radial direction.

* * * * *